May 19, 1953
A. S. KINSINGER
2,638,832
STRUCTURE FOR MOUNTING EXCAVATING AND PIPE
AND CABLE LAYING MEANS ON TRACTORS
Filed Jan. 13, 1951
5 Sheets-Sheet 1
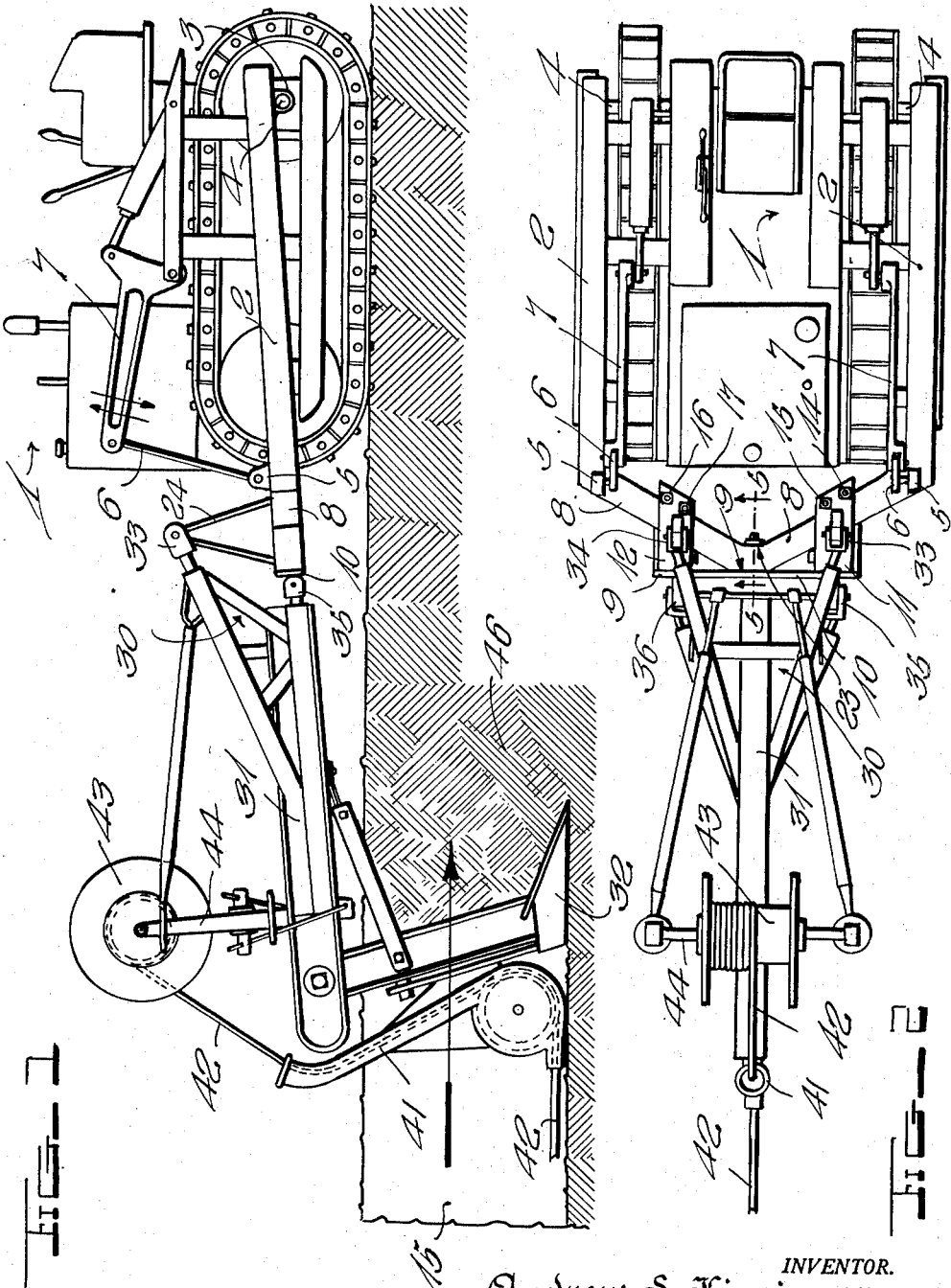
INVENTOR.
Andrew S. Kinsinger,
BY
John B. Brady
ATTORNEY May 19, 1953 A. S. KINSINGER 2,638,832
STRUCTURE FOR MOUNTING EXCAVATING AND PIPE
AND CABLE LAYING MEANS ON TRACTORS
Filed Jan. 13, 1951 5 Sheets-Sheet 2
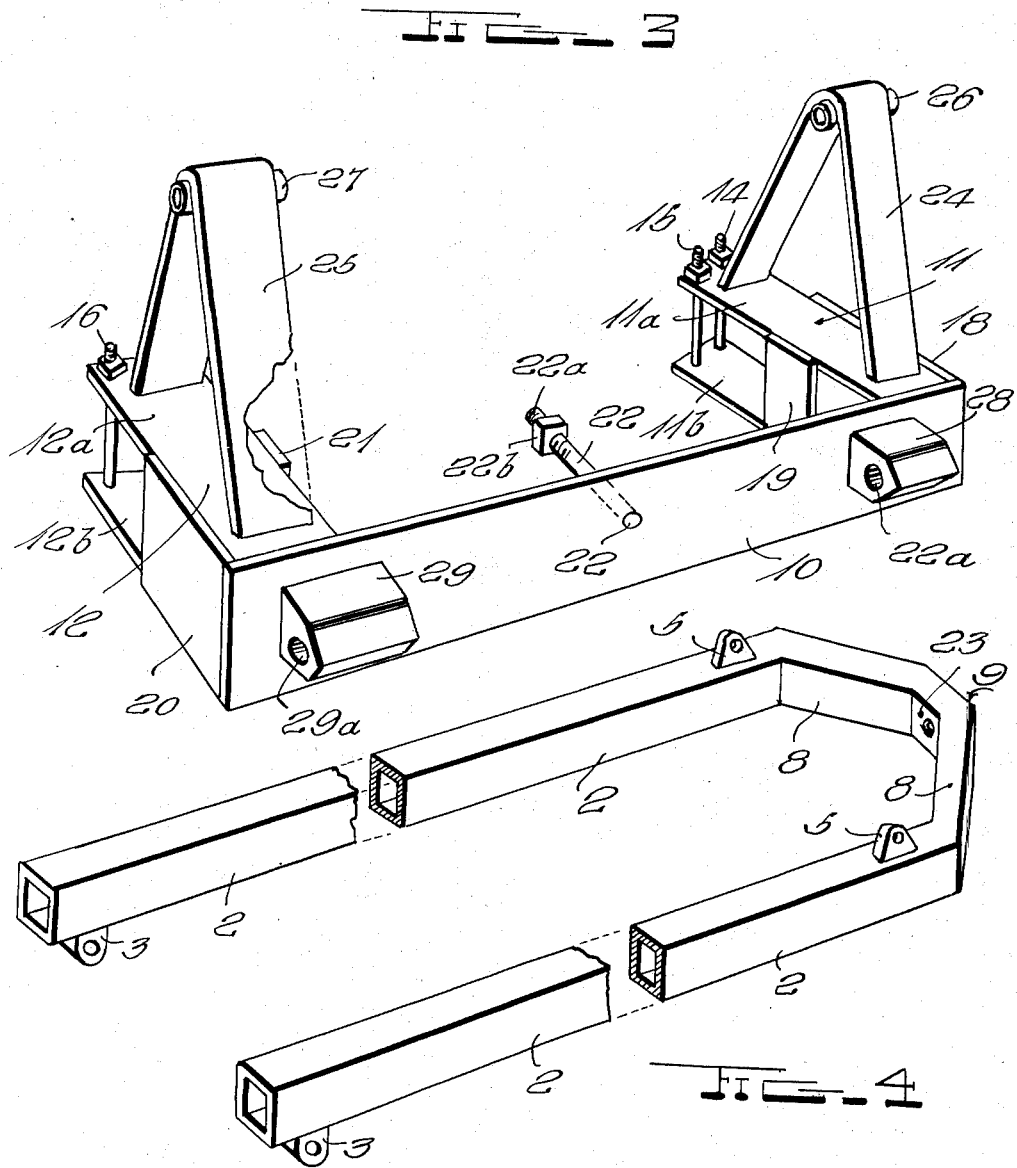
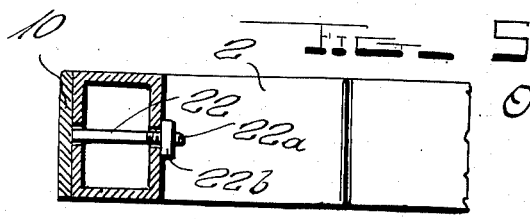
INVENTOR.
Andrew S. Kinsinger,
BY
John B. Grady
ATTORNEY

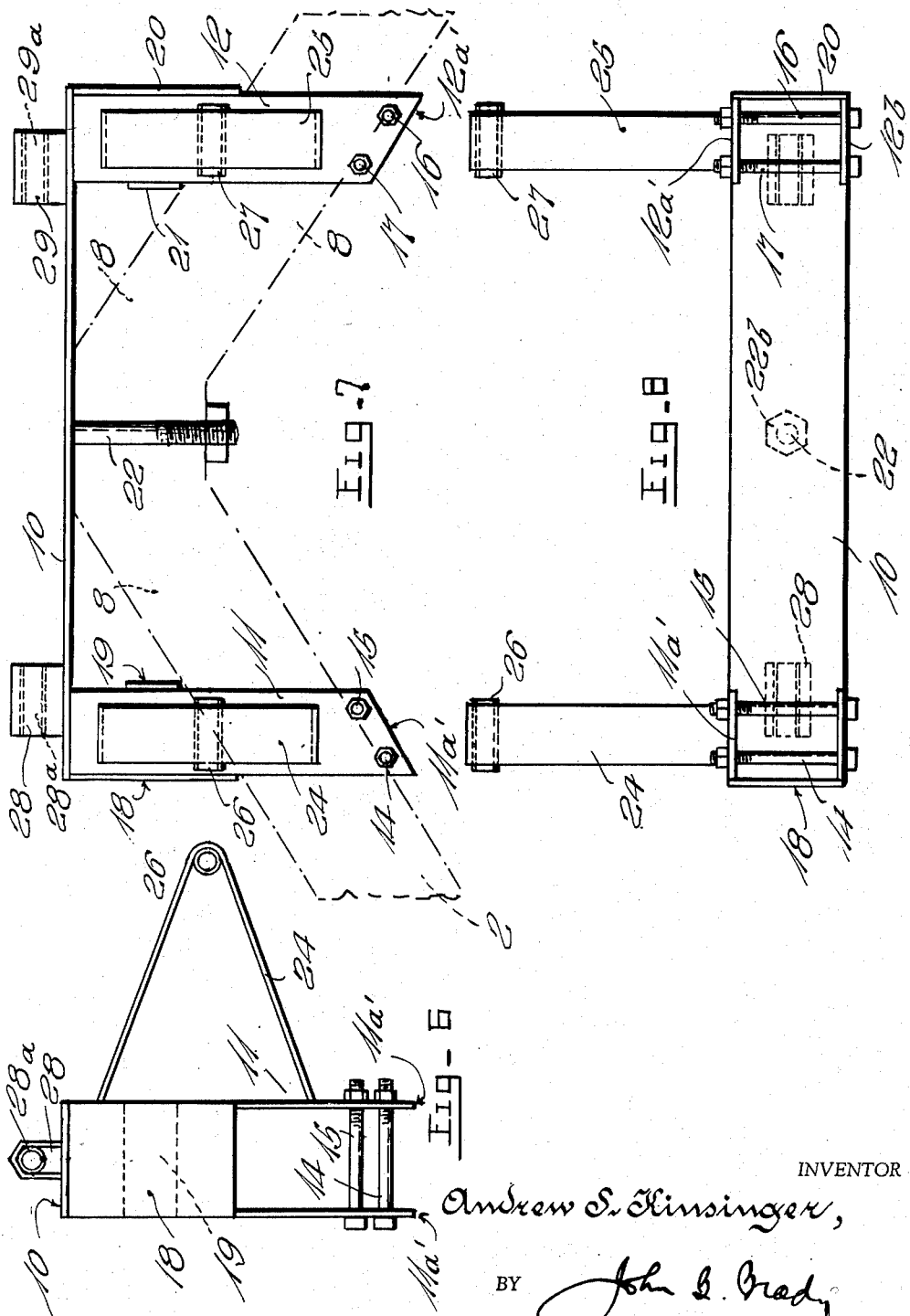

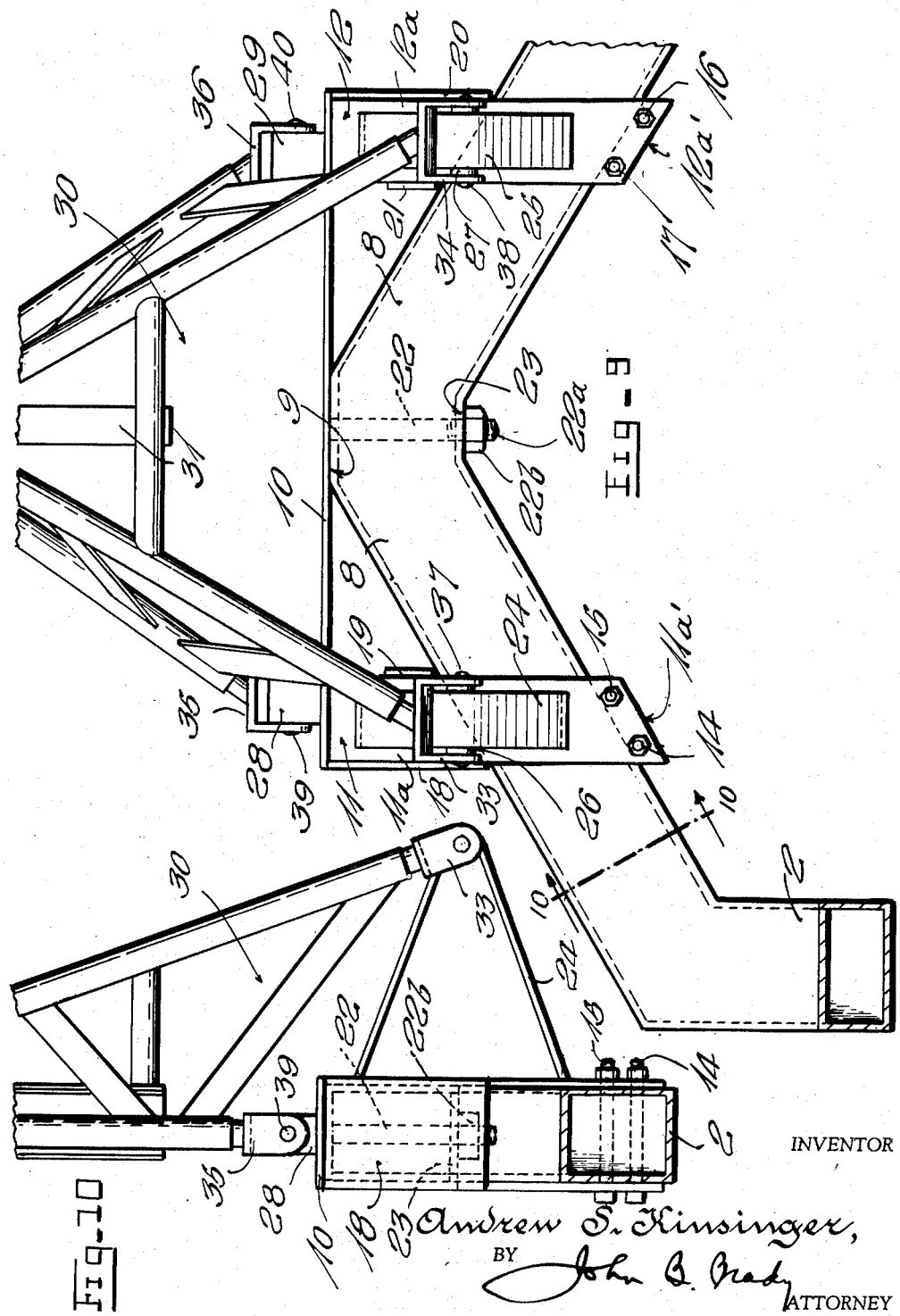

Patented May 19, 1953

2,638,832

UNITED STATES PATENT OFFICE 2,638,832

STRUCTURE FOR MOUNTING EXCAVATING AND PIPE AND CABLE LAYING MEANS ON TRACTORS

Andrew S. Kinsinger, Gordonville, Pa.

Application January 13, 1951, Serial No. 205,939

9 Claims. (Cl. 97—47.16)

My invention relates broadly to machines for laying pipe, cable and flexible conduit and more particularly to an adapter attachment for tractors for facilitating the mounting of tools for manipulation by the tractor in the laying of pipe, cable and flexible conduit.

One of the objects of my invention is to provide a structure for mounting tools for manipulation by a tractor in the laying of pipe, cable and flexible conduit.

Another object of my invention is to provide a structure of clamping means adapted to be secured to the manipulator frame of a tractor for the mounting of tools thereon in carrying out a process of laying pipe, cable and flexible conduit.

Still another object of my invention is to provide a construction of substantially universal adapter which is capable of being applied to the manipulator frame structure of a wide variety of different types of tractors for mounting tools for use in the laying of pipes, cables and flexible conduits.

Still another object of my invention is to provide a construction of adapter capable of mounting upon the manipulator frame of a wide variety of tractors where the manipulator frame is provided with resilient clamping means and coacting abutment means for rigidly maintaining the adapter on the manipulator frame and providing a mounting for an incision-type tool for use in the laying of pipe, cable and flexible conduit.

Other and further objects of my invention reside in the construction of adapter providing a coupling between the manipulator frame of a tractor and the frame of the beam of an incision-type pipe, cable and flexible conduit laying tool as set forth more fully in the specification hereinafter following by reference to the accompanying drawings in which:

Figure 1 is a side elevational view of a tractor and an incision-type tool for the laying of pipe, cable and flexible conduit and showing more particularly in side elevation the construction of the adapter of my invention; Fig. 2 is a top plan view of the tractor and tool assembly shown in Fig. 1 and illustrating particularly the structure of the adapter attached to the manipulator frame of the tractor; Fig. 3 is a perspective view of the adapter of my invention about to be applied to the manipulator frame of the tractor and arranged to receive the frame of the beam of the incision-type tool used in the laying of pipe, cable, and flexible conduit; Fig. 4 is a perspective view of one of the conventional type manipulator frames carried by a tractor, this view being representative of a wide variety of shapes of manipulator frames; Fig. 5 is a fragmentary sectional view taken on line 5—5 of Fig. 2 and showing particularly the abutment of the adapter of my invention with the manipulator frame of the tractor; Fig. 6 is an end elevational view of the adapter of my invention illustrated in raised or vertical position; Fig. 7 is an enlarged top plan view of the adapter showing in dotted lines the manipulator frame of the tractor with which the adapter coacts; Fig. 8 is a rear elevational view of the adapter to which the manipulator frame of the tractor is presented in establishing coupling between the tractor and the frame of the beam of the incision-type pipe, cable and flexible conduit laying tool; Fig. 9 is a fragmentary enlarged plan view showing the coupling relationship of the manipulator frame, the adapter and the frame of the incision-type pipe, cable and flexible conduit laying tool; Fig. 10 is a side elevational view of the assembly shown in Fig. 9 with the manipulator frame illustrated in section on line 10—10 of Fig. 9; Fig. 11 is a transverse sectional view taken through the manipulator frame and the adapter and showing particularly the manner in which the adapter is effectively clamped on the manipulator frame for withstanding the stresses and strains to which the incision tool and the associated appliances are subjected, the view being taken on line 11—11 of Fig. 12; Fig. 12 is a fragmentary cross-sectional view taken on line 12—12 of Fig. 11; Fig. 13 is a cross-sectional view taken on line 13—13 of Fig. 11; and Fig. 14 is a cross-sectional view taken on line 14—14 of Fig. 11.

In carrying out the process of laying pipes, cables and flexible conduits using the equipment set forth in more detail in my co-pending applications, Serial Number 149,379 filed March 13, 1950, for Composite Excavating and Pipe Laying Machine; Serial Number 185,090 filed September 15, 1950, for Composite Excavating and Cable and Flexible Conduit Laying Machine; Serial Number 188,550 filed October 5, 1950, for Composite Excavating and Earth Distributing and Leveling Machine; Serial Number D. 13,246 filed December 2, 1950, for Attachment for Tractors for Use in Excavating and the Laying of Pipes and Cables, I have found that a wide variety of structures of manipulator frames exist on different types of tractors in use in different geographical areas. Accordingly in order to provide for the installation of the tool of my invention universally on the several different available structures of tractors, I have developed the adapter of my present invention. The adapter of this invention forms a coupling means capable of being fitted upon a wide variety of different structures of manipulator frames of different types of tractors to serve as a mounting means for the frame of the beam of the incision-type tool employed in the system of my invention. The adapter which is the subject of the present invention is provided with a front abutment plate and rearwardly projecting symmetrically spaced arms adapted to bridge spaced portions of the manipulator frame of the tractor. The arms are provided with resilient gripping portions adapted to embrace the manipulator frame and each include securing bolt members which clamp the resilient gripping portions of the arms on the manipulator frame. Plates are carried by the spaced arms which serve as rigid abutments with respect to the manipulator frame for insuring the substitute coupling relationship between the manipulator frame and the frame of the beam of the incision-type tool. I have found the adapter of my invention capable of coupling the frame of the beam of the incision-type tool which I describe more particularly in the aforesaid co-pending applications, to a wide variety of manipulator frames of different types of tractors.

Referring to the drawings in more detail, reference character 1 represents a tractor of conventional construction having a manipulator frame designated at 2 having downwardly extending lugs 3 adjacent the ends thereof and pivotally connected adjacent the rear of the tractor as represented at 4 and carrying vertically extending lugs 5 adjacent the front thereof serving as pivotal connecting means for the links 6 which connect with the hydraulically actuated manipulator arms 7 for variable elevating and lowering the manipulator frame 2.

The front of the manipulator frame 2 is symmetrically tapered as represented at 8 and terminates in a central flattened portion 9 at the apex of the manipulator frame. The flattened apex portion 9 forms a flat bearing surface for the abutment plate 10 which extends transversely of the manipulator frame and carries rearwardly extending arms 11 and 12 symmetrically with respect to each end thereof. The rearwardly extending arms 11 and 12 are constituted by pairs of substantially parallel spaced resilient plates which are welded at their forward ends to the rear of the abutment plate 10 and which extend rearwardly and substantially parallel to each other terminating on a bias as represented at 11a' and 12a' in Figs. 7 and 9. The ends of the resilient plates 11a and 11b carry upwardly extending adjustable clamping bolts 14 and 15. The ends of the resilient plates 12a and 12b are interconnected by vertically extending adjustable clamping bolts 16 and 17. The resilient plates 11a and 11b are provided with vertically extending interconnecting side plates 18 and 19 which are welded to the edges of the resilient plates 11a and 11b in a position adjacent the abutment plate 10. Similarly the resilient plates 12a and 12b are provided with vertically extending side plates 20 and 21 welded to the edges of the resilient plates 12a and 12b adjacent the abutment plate 10. The vertically extending plates 18—19 and 20—21 have their edges terminating at such distance from the abutment plate 10 that the tapered portions 8 of the manipulator frame 2 seat against the edges of plates 18—19 and 20—21 as spaced abutments. Thus the adapter may be telescopically engaged over the tapered end of the manipulator frame with the arms 11 and 12 projecting rearwardly and symmetrically with respect to each side of the manipulator frame. The abutment plate 10 carries a rod member 22 extending rearwardly therefrom at the center thereof. Rod member 22 is screw threaded on the end thereof as represented at 22a and is engaged by a fastening nut 22b which is adapted to clamp against the rear of the apex portion of the manipulator frame as represented more clearly at 23 in Fig. 9. Thus a rigid connection is effected between abutment plate 10 and the tapered portions 8 of manipulator frame 2.

The rearwardly projecting plates 11a and 12a carry upwardly extending frames 24 and 25 terminating in sleeves 26 and 27. The upwardly extending frames 24 and 25 are welded to resilient plates 11a and 12a. The abutment plate 10 carries at its front the spaced members 28 and 29 which are symmetrically disposed with respect to each side of the center of the abutment plate 10 and wherein horizontally disposed bores 28a and 29a extend. The sleeves 26 and 27 and the bores 28a and 29a serve as connecting means for the ends of the frame 30 which projects rearwardly and outwardly from the beam 31 of the incision-type tool which I have represented at 32 in Fig. 1. The frame 30 terminates in quadrilaterally spaced yokes shown at 33, 34, 35 and 36. As shown in Figs. 9 and 10 yoke 33 embraces sleeve 26 and is mounted with respect thereto by pin 37. Yoke 34 embraces sleeve 27 and is mounted with respect thereto by pin 38. Yoke 35 embraces lug 28 and is mounted with respect to the bore 28a thereof by pin 39. Yoke 36 embraces lug 29 and is mounted with respect to bore 28a thereof by means of pin 40.

The beam 31 which carries the incision-type tool 32 may also be equipped with the cable or conduit guide shown at 41 for delivering the flexible cable or conduit represented at 42 from the reel 43 mounted on the yoke 44 supported from the top of beam 31. I may also mount on beam 31 behind the incision-type tool 32 various attachments for pulling pipe, cable and conduit through the incision 45 produced in the earth 46 as the tractor 1 moves over the surface of the earth or as more fully explained in my above enumerated co-pending applications.

The adapter constituted by abutment plate 10 and upwardly extending frames 24 and 25 serve as a coupling means between the frame 30 of the beam 31 of the incision-type tool where the frame 30 is attachable through the arms 11—12 with the manipulator frame embraced by the edge abutment plates 18—19 and 20—21, as shown more particularly in Figs. 11-14. The abutment plates 18—19 and 20—21 are so proportioned that these abutment plates as illustrated more clearly in Fig. 11 establish firm contact with the front wall of the tapered portions 8 of the manipulator frame 2, while the clamping bolts 14 and 15 and 16 and 17 establish firm clamping contact with the rear of the tapered portions 8 of the manipulator frame 2. Thus a symmetrically constructed rigid bridge is formed by the adapter across the front of the manipulator frame 2. Severe strains to which the manipulator may be subjected either in longitudinal or lateral directions are thus resisted by the rigid mounting of the adapter on the manipulator frame.

I have found the adapter of my invention highly practical in interconnecting the frame of the incision-type tool of my invention with the manipulator frame of a wide variety of different types of tractors. While I have described the adapter in certain preferred embodiment, I realize that modifications may be made and I desire that it be understood that no limitations upon my invention are intended other than may be imposed by the scope of the appended claims.

What I claim as new and desire to secure by Letters Patent of the United States is as follows:

1. An adapter for interconnecting the frame of an incision-type tool with a manipulator frame of a tractor comprising in combination with the manipulator frame of a tractor in which the manipulator frame includes a flat central portion and symmetrically disposed diverging side portions, an abutment plate having a rod member projecting rearwardly therefrom and extendable through the flat central apex portion of the manipulator frame, resilient arms projecting rearwardly from opposite ends of said abutment plate and embracing the diverging side portions of the manipulator frame and secured thereto and connecting means formed on certain of said resilient arms and on said abutment plate and providing connections to the frame of an incision-type tool.

2. An adapter for coupling the frame of an incision-type tool with the manipulator frame of a tractor in which the manipulator frame of the tractor terminates in a flat central apex portion and symmetrically diverges toward the tractor on each side thereof, an adapter plate having a central rod member projecting rearwardly therefrom and adapted to be fastened through an aperture formed in the flat central apex portion of the manipulator frame, said abutment plate having resilient arms extending rearwardly from opposite ends thereof and adapted to embrace the diverging portions of the manipulator frame, connection means carried by the front of said abutment plate and the tops of certain of said resilient arms, a frame for an incision-type tool terminating in yokes embracing each of said connection means and fastening means extending between said yokes and said connection means.

3. An adapter for interconnecting the frame of an incision-type tool with the manipulator frame of a tractor which comprises in combination with the manipulator frame of a tractor which includes a flat centrally apertured apex portion and rearwardly diverging side portions, a transversely extending abutment plate having a screw threaded rod extending rearwardly therefrom and adapted to enter the centrally apertured apex portion of the manipulator frame. Means for fastening said rod to the said apex portion of the manipulator frame, a rearwardly extending arm secured adjacent each end of said abutment plate and terminating in resilient clamps at the rear ends thereof, means for securing said resilient clamps to the diverging side portions of the front of the manipulator frame, connecting means carried by the front of the abutment plate and by certain of said resilient arms, an incision-type tool supported by a frame terminating in quadrilaterally spaced supporting arms and means interconnecting said supporting arms with the aforesaid connection means for establishing coupling relationship between the manipulator frame of the tractor and the incision-type tool.

4. A structure for mounting the frame of an incision-type tool on the manipulator frame of a tractor which comprises in combination with a manipulator frame which includes a flat central longitudinally apertured apex portion interconnected by rearwardly extending diverging side portions, a laterally extending abutment plate having a centrally disposed rearwardly extending rod member adapted to extend through the apertured flat central apex portion of the manipulator frame, fastening means interconnecting said rod member with the flat central apex portion of the manipulator frame, said abutment plate having pairs of rearwardly extending resilient plates projecting from opposite ends thereof and embracing the diverging side portions of the manipulator frame, connection means carried by the front of said laterally extending abutment plate and by certain of said rearwardly extending resilient arms, an incision-type tool having a supporting frame terminating in quadrilaterally spaced connection means and fastening means extending through the connection means on said last mentioned frame and the connection means carried by said laterally extending abutment plate and by certain of said arms.

5. A structure for mounting the frame of an incision-type tool on the manipulator frame of a tractor as set forth in claim 4 in which said resilient arms terminate at their rear ends on a bias and wherein clamping bolts extend through the said arms adjacent the biased ends thereof and abut with the rear of the manipulator frame for maintaining said laterally extending abutment plate in contact with the front of the manipulator frame.

6. A structure for mounting the frame of an incision-type tool on the manipulator frame of a tractor as set forth in claim 4 in which said resilient arms are constituted by plates which extend in contact with the top and bottom faces of the manipulator frame and in which clamping bolts extend between the ends of said plates for mutually clamping said plates with respect to the rear of the manipulator frame and confining said abutment plate against the front of said manipulator frame.

7. A structure for mounting the frame of an incision-type tool on the manipulator frame of a tractor as set forth in claim 4 in which said arms are constituted by pairs of spaced plates which extend in contact with the top and bottom surfaces of said manipulator frame, plates extending normal to the planes of said resilient plates and terminating in edge abutments adapted to effect a rigid abutment with the diverging side portions of the manipulator frame for positively supporting the ends of the laterally extending abutment plate with respect to the diverging side portions of said manipulator frame and means extending through the end of said resilient plates for clamping said resilient plates with respect to said manipulator frame.

8. A structure for mounting the frame of an incision-type tool on the manipulator frame of a tractor as set forth in claim 4 in which the connection means carried by certain of said resilient arms are spaced upwardly from said arms and substantially in alignment with the connection means carried by the front of said laterally extending abutment plate.

9. A structure for mounting the frame of an incision-type tool on the manipulator frame of a tractor as set forth in claim 4 in which said resilient arms are formed by parallel extending plates having their flat faces in contact with the top and bottom faces of said manipulator frame and in which clamping bolts extend through the said plates and establish abutment with the rear of the manipulator frame and wherein the exterior edges of said resilient plates are interconnected by plate members which extend from the rear of said laterally extending abutment plate to the front of said manipulator frame and in which plate members are fastened to the interior edges of said resilient plates and form an abutment with the front of said manipulator frame for rigidly securing the adapter to the manipulator frame.

ANDREW S. KINSINGER.

References Cited in the file of this patent

UNITED STATES PATENTS

| Number | Name | Date |
|---|---|---|
| 2,295,458 | Edwards | Sept. 8, 1942 |
| 2,312,255 | Lowdermilk | Feb. 23, 1943 |